April 7, 1970  F. J. RODE  3,504,774
STRUCTURE FOR AND METHOD OF DRIVING A
METAL WORKING PRESS
Filed Sept. 25, 1967  2 Sheets-Sheet 1
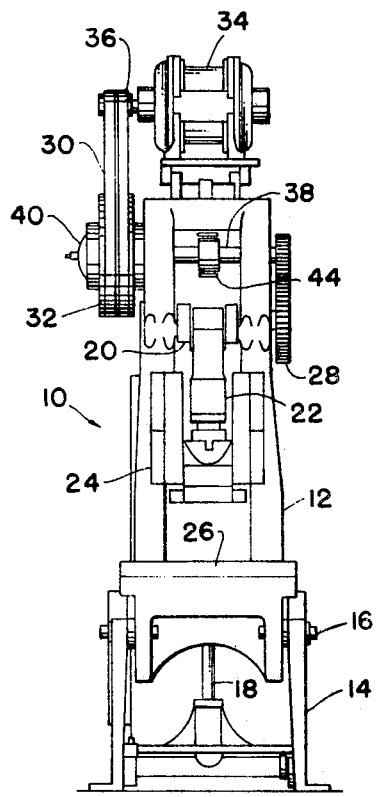
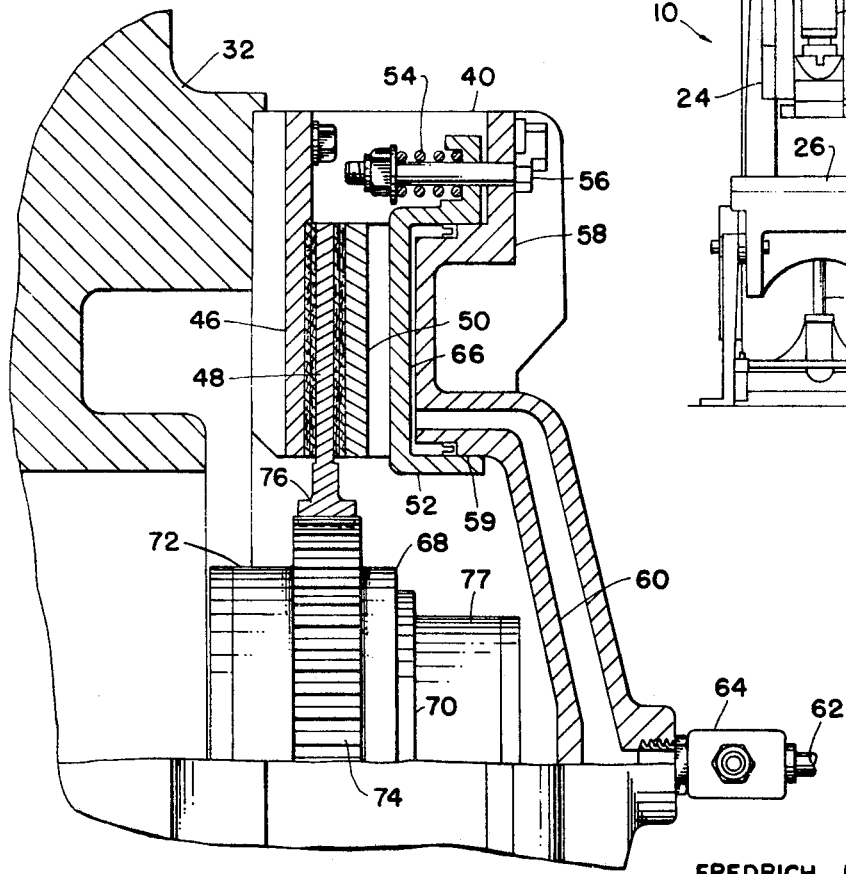
INVENTOR
FREDRICH J. RODE
BY
ATTORNEYS April 7, 1970   F. J. RODE   3,504,774
STRUCTURE FOR AND METHOD OF DRIVING A
METAL WORKING PRESS
Filed Sept. 25, 1967   2 Sheets-Sheet 2
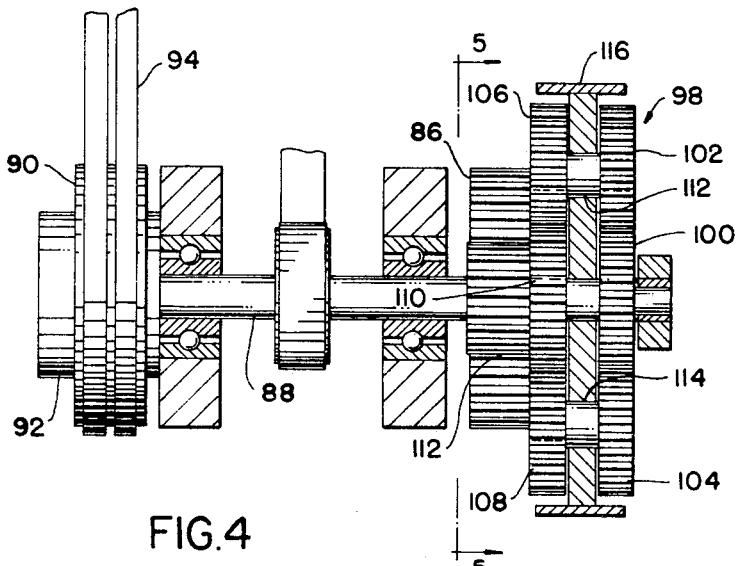
FIG. 4
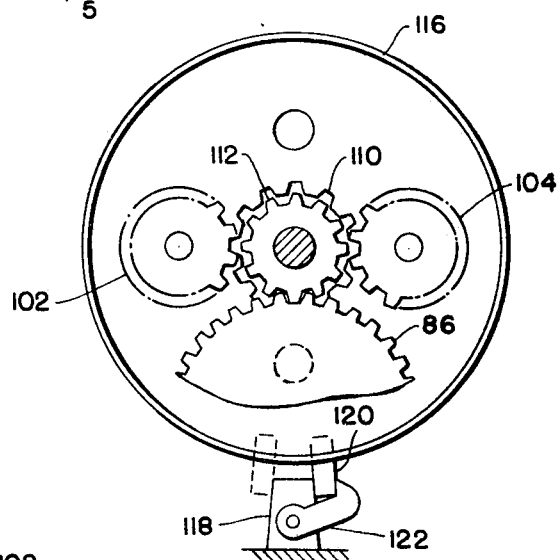
FIG. 5
FIG. 3
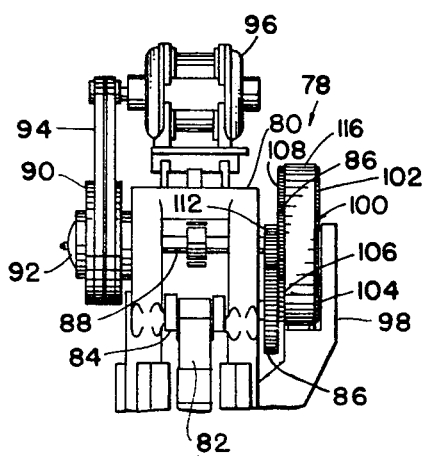
INVENTOR
FREDRICH J. RODE
BY *Whittemore,*
*Hulbert & Belknap*
ATTORNEYS

United States Patent Office 3,504,774
Patented Apr. 7, 1970

3,504,774
STRUCTURE FOR AND METHOD OF DRIVING A METAL WORKING PRESS
Fredrich J. Rode, Chicago, Ill., assignor to Di-Dro Systems, Inc., Detroit, Mich., a corporation of Michigan
Filed Sept. 25, 1967, Ser. No. 670,119
Int. Cl. F16d *21/08, 47/02;* F16h *21/38*
U.S. Cl. 192—48.7
3 Claims

ABSTRACT OF THE DISCLOSURE

Structure for and a method of starting presses stalled at approximately bottom dead center, which presses have a drive train including a continuously driven fly wheel, a drive shaft and a friction clutch therebetween, is disclosed.

The method of starting the presses includes the step of first disengaging the friction clutch, disconnecting the press load from the friction clutch, engaging the friction clutch under no load and subsequently placing the press load on the engaged friction clutch.

The structure for disconnecting the press load from the friction clutch and for subsequently placing the press load on the engaged friction clutch may be either a positive clutch installed for reverse operation in series with the friction clutch between the fly wheel and drive shaft or a gear train between the drive shaft and press drive gear including a sun gear and planetary gears and means for selectively permitting rotation of the planetary gears about the sun gear for a portion of a revolution of the press drive shaft and subsequently locking the planetary gears in a fixed position with respect to rotation about the sun gears for rotation about their axes.

BACKGROUND OF THE INVENTION

Field of the invention

The invention relates to press drive and refers more specifically to a structure for and a method of driving a metal working press permitting starting of the press from a substantially bottom dead center position when it has been stalled due to a greater press load than the friction clutch can perform under existing conditions, by providing a no load condition as in starting the press at the top of a stroke.

Description of the prior art

Prior metal working presses are being driven by a continuously motor rotated fly wheel, a press drive shaft and friction clutch structure positioned between the fly wheel and drive shaft for connecting the fly wheel to the drive shaft. With such structure it has been substantially impossible to start a press in a bottom dead center position particularly if the press has been stalled in the bottom dead center position due to overloading in a cycle of operation thereof.

In such circumstances when an attempt to start a press at bottom dead center has been made after initially disengaging the friction clutch, plates of the clutch connected to the fly wheel are being rotated rapidly with the fly wheel while the other plates of the clutch connected to the press load have remained stationary. With all clutch plates the generated friction and consequent heat causes the clutch plate material to give out emulsive material lubricating the clutch plates, causing what is commonly known as clutch fading.

Therefore, in the past when presses have stopped at bottom dead center during a cycle of operation, it has been necessary to remove the load from the presses by means of heavy jacks applied between the bed and crown of the presses. This places considerable stress on the frame of the presses, is time-consuming and tedious requiring expert workmen and can cause permanent damage to the presses. In certain large presses with shrank tie rods, the tie rods must be unshrunk or loosened by other means, such as hydraulics in the bed or tie rods, to relieve the load before the press can be rotated.

SUMMARY OF THE INVENTION

It is, therefore, one of the objects of the present invention to provide structure for and method of driving a press which will allow starting of the press from bottom dead center with a minimum of difficulty.

The method of starting a press stalled at bottom dead center under load in accordance with the invention includes the steps of disengaging the clutch, disconnecting the clutch from the press to place the clutch in a no load condition, reversing the press drive wheel for a portion of a rotation, engaging the clutch under no load while driving the press fly wheel in a reverse direction the portion of a rotation and subsequently connecting the clutch to drive the press after engagement of the clutch.

The structure for performing the method of the invention includes in one modification, a separate positive clutch connected for reverse operation positioned in series with the friction clutch between the fly wheel and drive shaft of the press. In a second modification of the invention a gear train provides the means for disconnecting the press load and clutch for a portion of a rotation of the press fly wheel.

The gear train includes a pair of sun gears rotatably mounted on the press drive shaft, separate pairs of planet gears engaged with the sun gears and means for selectively permitting rotation of the planet gears about the axis of rotation of the press drive shaft in engagement with the sun gears and locking the planet gears in a fixed position with respect to rotation about the press drive shaft.

BRIEF DESCRIPTION OF THE DRAWINGS

FIGURE 1 is a front view of a press including one modification of press drive structure constructed in accordance with the invention for practicing the method of press drive of the invention.

FIGURE 2 is an enlarged partial cross section view of press drive structure as illustrated in FIGURE 1.

FIGURE 3 is a partial front view of press structure including another modification of press drive structure constructed in accordance with the invention.

FIGURE 4 is an enlarged partial cross section of the press drive structure illustrated in FIGURE 3.

FIGURE 5 is a partial section view of the press drive structure illustrated in FIGURE 4 taken substantially on the line 5—5 in FIGURE 4.

DESCRIPTION OF THE PREFERRED EMBODIMENTS

The press structure 10 illustrated in FIGURE 1 is a Bliss inclinable press including a frame 12 pivoted on the base 14 by means of pivot connections 16 to provide a desired press inclination in accordance with the adjustment of the adjusting screw 18. The press 10 further includes a crankshaft 20 and a crank 22 supported for reciprocal movement in the guides 24 to move a die connected to the crank 22 toward and away from the press bed 26 in accordance with the rotation of the press drive gear 28 secured to the crankshaft 20 for rotation therewith.

Such press structure is conventional and will not therefore be considered in further detail herein. In addition, it will be understood that the press structure disclosed is not to be considered limiting and that the press drive structures and methods disclosed hereinafter may be used with different types of presses and may in fact have advantages in presses which are heavier than the usual inclinable press.

The drive structure 30 for the press 10, as shown in FIGURE 1, includes a fly wheel 32 mounted for rotation on press drive shaft 38 which is continuously driven by the reversible electric motor 34 through the belt drive 36. The press drive shaft 38 is rotatably mounted in the press frame 12. Friction clutch 40 is operable between the fly wheel 32 and press drive shaft on engagement thereof. Press drive gear 28 is then driven on rotation of the press drive shaft 38 through the pinion 42 secured to the press drive shaft 38 for rotation therewith and in mesh with the press drive gear 28. The usual press brake structure 44 is provided on the press drive shaft 38.

As shown in more detail in FIGURE 2, the clutch 40 is a friction clutch having a first annular clutch plate 46 secured to the fly wheel 32 for rotation therewith, an intermediate annular clutch plate 48 and a third clutch plate 50 mounted on the annular piston 52. The piston 52 is urged in a direction to disengage the clutch plates 46, 48 and 50 by means of the spring 54 and bolt 56 extending through the clutch frame 58. Frame 58 provides an annular cylinder 59 over which the piston 52 reciprocates.

In operation of the clutch 40, air is fed into the air passage 60 from the conduit 62 through coupling 64 into the chamber 66 formed between the piston 52 and cylinder 59. The piston 52 is thus urged to the left in FIGURE 2 and the annular clutch plates 46, 48 and 50 are urged into contact to engage the clutch 40.

In the usual drive mechanism for industrial presses, the clutch plate 48 is connected directly to the drive shaft 38 for rotation therewith by means of a splined connection. Thus on urging of the annular plates 46, 48 and 50 into engagement to engage the clutch 40, the fly wheel 32 and press drive shaft 38 are connected so that the fly wheel 32 drives the press drive shaft 38. With such drive structure, if the drive shaft 38 is heavily loaded, that is, for example, when the crank 22 is at bottom dead center the resistance to movement of the plate 48 with the plate 46 on urging of the plates into contact with each other due to air pressure in the chamber 66 is so great that the clutch plates 46, 58 and 50 slip creating considerable friction and consequent heat. The heat deteriorates the usual clutch plates in such circumstances whereby they lubricate themselves to cause clutch fading.

Thus with the center clutch plate 48 connected directly to the drive shaft 38 as in the past, it has been substantially impossible to start a press 10 with the crank 22 stalled in a bottom dead center position. Therefore, in accordance with the present invention, a positive mechanical clutch 68 has been added in series between the clutch 40 and the drive shaft 38.

The clutch 68 includes an inner portion 70 secured to the drive shaft 38 for rotation therewith, an outer portion 72 sleeved over the inner portion 70 and including a splined peripheral portion 74 engaged with the splined inner periphery 76 of the intermediate clutch plate 48. Clutch 68 may be any reversible positive mechanical clutch, such as a rolling key clutch, operable on energizing the actuating mechanism 77 therefore to engage or disengage on rotation of the inner portion 70 relative to the outer portion 72 of a predetermined angular distance, for example, 180°.

With the additional clutch 68, when a press 10 is stalled at approximately bottom dead center, the clutch 40 is disengaged, the fly wheel 32 is driven in a reverse direction for a portion of a revolution of the fly wheel to disengage the clutch 68. The fly wheel 32 is then driven in the forward direction again and the clutch 40 is engaged under no load during the portion of a cycle of rotation of the fly wheel 32 before the clutch 68 engages again.

On engagement of the clutch 68, the press load is raised since the friction clutch 40 has been engaged.

The structure for starting a press with the press at bottom dead center illustrated in FIGURES 3, 4 and 5 is intended for use on larger presses than the inclinable press illustrated in FIGURE 1. As shown in FIGURE 3, the press structure 78 includes a frame 80, crank 82, crankshaft 84, press drive gear 86, drive shaft 88, fly wheel 90, friction clutch 92, drive belt 94 and reversible electric motor 96, substantially the same as the equivalent structure illustrated in FIGURE 1. The intermediate clutch plate of the clutch 92 is, however, splined directly to the drive shaft 88 in the usual manner.

The structure 98 for permitting engagement of the clutch 92 under no load, as best shown in FIGURES 4 and 5, includes a first sun gear 100 secured to the press drive shaft 88 for rotation therewith, a first pair of planetary gears 102 and 104 engaged with the sun gear 100, a second set of planetary gears 106 and 108 engaged with a second sun gear 110 mounted for rotation on the drive shaft 88 and a pinion 112 secured to the sun gear 110 and in engagement with the press drive gear 86. The planet gears 102 and 106 and the planet gears 104 and 108 are rigidly secured together for rotation and are mounted in bearings 113 and 114 carried by the mounting disc 116 therefor which, in turn, is rotatably mounted on the press drive shaft 88 and may be a brake drum.

As shown best in FIGURE 5, an abutment 118 is provided on the machine frame 78 and a detent 120 is secured to the mounting disc 116. Cam locking means 122 is pivoted on the abutment 116 and functions to lock the detent 120 in a position against the abutment 118 on driving of the press in a forward direction.

In operation of the structure illustrated in FIGURES 3 through 5 to start a press which has been stalled in bottom dead center, the clutch 92 is first disengaged, the press is driven backwards for a portion of a revolution of the fly wheel 90 with the detent 120 unlocked so that the planet gears 102 and 104, 106 and 108 rotate around the sun gears 100 and 110 and produce no rotation of the sun gear 110 or pinion 112. The detent 120 may at this time be in the dotted line position shown in FIGURE 5.

The press is then driven in the forward direction again and the clutch 92 is engaged while the planetary gears 102, 104, 106 and 108 again rotate about the sun gears without causing rotation of the pinion 112. When the detent 120 on the mounting disc 116 engages the abutment 118, the planetary gears 102, 104, 106 and 108 are locked in a predetermined position with respect to rotation thereof around the sun gears so that they are caused to rotate about their own axis on rotation of the sun gear 100 to rotate the sun gear 110 and pinion 112 and thus again drive the drive gear 86, but only after the clutch 92 has been fully engaged under a no load condition.

When the detent engages the abutment 118 it will be understood that it cams over the spring-pressed pawl 22 and is locked in position until the pawl 122 is manually turned in a clockwise direction as shown in FIGURE 5 to release the detent 120 to again permit reverse driving of the drive shaft 88 under no load, should the press 78 again become stuck at bottom dead center.

While two embodiments of the present invention have been disclosed in detail, it will be understood that other embodimentst and modifications thereof are contemplated by the inventor. It is the intention to include all embodiments and modifications as are defined by the appended claims within the scope of the invention.

What I claim as my invention is:

1. In combination a press having a press drive gear, a press drive shaft and driving means therefor, a friction clutch positioned between the drive shaft and driving means therefor and means for engaging said friction clutch under no load with the press stalled due to heavy load at approximately bottom dead center including a gear train for transmitting torque to the friction clutch which gear train is positioned between the press drive shaft, and the press drive gear and which gear train includes a first sun gear secured to the press drive shaft for rotation therewith, a first pair of planet gears engaged with the sun gear, a second set of planet gears secured to the first set of planet gears for rotation therewith, a second sun gear engaged with the second set of planetary gears, means for mounting the planetary gears for rotation about the axis thereof and for rotation about the sun gears about the axis of the drive shaft, a pinion connected to the second sun gear for rotation therewith in mesh with the press drive gear and means for selectively rotating the sets of planetary gears about the respective sun gears for a portion of a revolution of the press drive shaft sufficient to permit engagement of the friction clutch and thereafter preventing rotation of the planetary gears about the sun gears and the axis of the drive shaft.

2. Structure as set forth in claim 1 wherein the means for selectively rotating the planetary gears about the sun gears and the axis of the drive shaft comprises an abutment positioned in a fixed location with respect to the mounting means for the planetary gears and a detent carried by the mounting means for the planet gears engageable with said abutment on rotation of the planetary gears about the sun gears and the axis of the drive shaft.

3. Structure as set forth in claim 2 and further including means for locking the detent in engagement with the abutment on rotation of the mounting means for the planetary gears in a forward press direction.

References Cited

UNITED STATES PATENTS

| | | | |
|---|---|---|---|
| 1,848,194 | 3/1932 | Page | 192—48.5 |
| 2,187,955 | 1/1940 | Sonnenberg | 192—48.5 |
| 2,594,666 | 4/1952 | Long | 192—48.5 |
| 2,639,619 | 5/1953 | Pater | 74—36 |

MARK NEWMAN, Primary Examiner

U.S. Cl. X.R.

74—36; 192—3.6, 48.5